Figure 1:
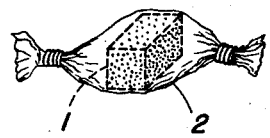

Dec. 31, 1957  H. D. ANSPON  2,817,878
PRODUCTION OF POLYMERIC a-CHLOROACRYLATE SHEETS
Filed May 22, 1953

Harry D. Anspon
INVENTOR
BY
ATTORNEYS

United States Patent Office 2,817,878
Patented Dec. 31, 1957

2,817,878

PRODUCTION OF POLYMERIC α-CHLORO-ACRYLATE SHEETS

Harry D. Anspon, Easton, Pa., assignor to General Aniline & Film Corporation, New York, N. Y., a corporation of Delaware Application May 22, 1953, Serial No. 356,891

13 Claims. (Cl. 18—58)

This invention is directed to a method of producing polymeric α-chloroacrylic acid ester sheets of uniform thickness and more particularly to the use in such method of a casting cell with fusible spacers.

High quality transparent polymeric sheets are most often obtained by casting a monomer or a monomer-polymer solution in a casting cell constructed of plate glass sheets arranged in a parallel face-to-face relationship. These cells are usually made by separating two identical sheets of polished plate glass with spacers and sealing the edges of the cell with a paper edge seal, flexible tubing or the like.

During polymerization of monomers, extensive shrinkage occurs which may amount to as much as 17 percent for methyl methacrylate or even 23 percent for methyl α-chloroacrylate. Because of this shrinkage the spacers between the glass plates of the casting cell must either be made of flexible material, or of a material soluble in the monomer and dissolving therein, or the spacers must be removed before substantial shrinkage during polymerization has occurred.

The use of flexible spacers of resilient or rubbery material, or the like, is unsatisfactory because such spacers tend to change dimensions (e. g. settle when the cell is horizontal) between the time the cell is constructed and the time it is filled with monomer. These changes in spacer dimensions result in the production of sheets which do not possess a uniform thickness or are thinner than the desired thickness.

Spacers which dissolve in the monomer whereby shrinkage during polymerization is permitted to occur have several disadvantages. The solution of these spacers in the monomer requires an unduly long time in some instances. The concentration of the solution of spacer material in the monomer is highest at the point where the spacer was located, whereby the overall optical uniformity of the sheet is effected. If the spacer material and the monomer contain the same basic units, such behavior is not as serious as when a spacer is made from a substance other than that being cast. This is practically impossible in the case of α-chloroacrylate polymers since spacers made therefrom are only slightly and very slowly dissolved by their corresponding monomers. By solution of the spacer in the monomer is meant solution or softening of the spacers by solvent action of the monomer to such an extent that they no longer resist the inward movement of the plates of the casting cell during shrinkage attendant on polymerization of the monomer.

It is possible to use non-flexible insoluble spacers such as those made of glass, phenolic resins or the like if the spacers are mechanically removed from the cell prior to the occurrence of polymerization shrinkage. In the casting of α-chloroacrylic acid esters, such spacers would be removed after the monomer solution in the casting cell has gelled and before any substantial polymerization shrinkage has occurred. Although such an expedient is possible with methyl methacrylate casting, it is not feasible with casting a α-chloroacrylate polymers such as methyl α-chloroacrylate and the like, due in part to the following reasons:

(1) The slight amount of shrinkage that occurs up to the time of gelling as well as the weight of the top sheet of plate glass make it difficult to slide the spacers from the edges of the cell.

(2) α-Chloroacrylate monomers such as methyl α-chloroacrylate are skin vesicants and lachrymators whereby the exposure and handling required in removing the spacers is hazardous and difficult due to the safety measures which must be taken such as use of masks, rubber gloves and the like.

(3) When an α-chloroacrylate monomer is polymerized in contact with air, it turns yellow upon final curing at 120° C. Brown-yellow areas accordingly appear adjacent to the spots where the spacers had been located.

(4) α-Chloroacrylate monomers polymerize more rapidly in contact with air whereby areas of pullaway occur adjacent to the spots where the spacers had been located.

(5) The heat stability (i. e. resistance to bubble formation) of α-chloroacrylate polymer sheets, whose edges are exposed to air is very poor in the exposed edges, which effect extends for a considerable distance into the sheet.

It has also been proposed, in connection with the casting of other types of polymers, to employ spacers made of thermoplastic material. Thermoplastic materials however do not have sharp melting points but soften over a wide range of temperatures whereby it would be extremely difficult to select such a material which would be sufficiently rigid at temperatures below that employed for polymerization to adequately support the weight of the upper cell wall and to keep the cell walls apart until the monomer in the cell has gelled, and sufficiently fluid at polymerization temperatures to offer no resistance to the desired movement of the upper and lower cell walls in compensation for the shrinkage attendant on polymerization.

The instant invention is based upon the discovery that the use of a casting cell provided with spacers made of fusible material enable the production of α-chloroacrylic acid ester polymer sheets of uniform thickness in a simple and efficient manner without the disadvantages resulting from the use of other types of spacing material.

The fusible spacers necessary in the operation of this invention are of low melting, dimensionally stable materials such as low melting organic mono-molecular compounds or polymers, low melting inorganic mono-molecular compounds or polymers, and low melting metals and alloys, all of which should have definite melting points falling within the desired range of temperatures. The melting point of the spacer material in any particular instance must be above the temperature of the initial gelling step, but preferably no higher than the temperature maintained during subsequent polymerization of the α-chloroacrylate polymer sheets. In general, the melting point should be between 35 and 100° C., preferably 45 to 60° C. Further, the boiling point of the spacer material should be well above the temperature of said subsequent polymerization and preferably above 200° C. at atmospheric pressure.

The following illustrative lists of materials may be used as fusible spacers in the process of this invention. Unidentified numbers represent percent by weight of the components.

Low melting metal alloys

Wood's metal (50 Bi, 25 Pb, 12.5 Sn, 12.5 Cd), M. P. 66° C.
Rose's metal
Lipowitz's alloy (50 Bi, 27 Pb, 13 Sn, 10 Cd), M. P. 70° C.
18.1 In, 41 Bi, 22.1 Pb, 10.6 Sn, 8.2 Cd—M. P. 46.9° C.
27.5 Bi, 27.5 Pb, 10 Sn, 34.5 Cd—M. P. 75° C.
43.8 Bi, 25 Pb, 25 Sn, 6.2 Cd—M. P. 80° C.
25 Pb, 50 Sn, 25 Cd—M. P. 86° C.
52 Bi, 50 Pb, 8 Cd—M. P. 92° C.

Amalgamated metal alloys

80 Wood's metal 20 Hg—M. P. 53° C.
Bismuth amalgam (80 Hg, 20 Bi)—M. P. 90° C.

Low melting organic compounds

|  | M. P., °C. | B. P., °C. |
| --- | --- | --- |
| p-dichlorobenzene | 53 | 174 |
| p-dimethylaniline | 41 | 262 |
| benzal acetone | 41 | 260 |
| benzal diacetate | 45 | 154—20 mm. |
| benzoic anhydride | 42 | 360 |
| N-benzoyl piperidine | 48 | 320 |
| bromoacetic acid | 49 | 208 |
| P-bromoacetophenone | 50 | 255—736 mm. |
| P-bromobenzylchloride | 42 | 245 |
| o-bromonitrobenzene | 43 | 261 |
| glyceryl tripalmitate | 65 | 310—20-0.1 mm. |
| glycol dilaurate | 52 | 188—20 mm. |
| indole | 52 | 253 |
| p-methoxyphenol | 53 | 243 |
| methyl acetylsalicylate | 50 | 134—9 mm. |
| methyl o-benzoylbenzoate | 52 | 350 |
| β-acetonaphthone | 55 | 301 |
| N-phenyl morpholine | 57 | 270 |
| phenyl p-tolyl ketone | 59 | 326 |
| tetrabromoethylene | 56 | 226 |
| p-toluenesulfonylethylamide | 61 |  |
| o-xylylene glycol | 64 |  |
| octanediol (1,8) | 63 | 172—20 mm. |

Low melting crystalline organic polymers

|  | M. P., °C. |
| --- | --- |
| Polymeric trimethylene succinate | 52 |
| Polymeric ethylene adipate | 50 |
| Polymeric trimethylene adipate | 45 |
| Polymeric hexamethylene succinate | 57 |
| Polymeric hexamethylene adipate | 56 |
| Polymeric hexamethylene sebacate | 67 |
| Polymeric ethylene sebacate | 79 |
| Polymeric pentamethylene carbonate | 44-6 |
| Polymeric hydroxydecanoic acid | 76 |

The preferred spaced material for use in the instant invention is the amalgamated metal alloy composed of 80 percent by weight of Wood's metal and 20 percent by weight of mercury, melting at 53° C. The spacer material may be melted and cast in cells with fixed brass spacers of the required thickness and the cooled casting may be removed in sheets and cut on a band saw into spacers of any size with the required thickness. However, any other method of forming the spacers may be employed.

The spacer material is of course preferably insoluble in the α-chloroacrylate monomer being cast. This property is possessed by the above mentioned amalgamated metal alloy which in addition is frequently porous enough so that it can contract sufficiently in melting to allow polymerization shrinkage to occur even when the spacer is imbedded directly (without wrapping) in the monomer solution. However, to insure uniform results, it is preferred to wrap the spacers in small flexible bags of regenerated cellulose or the like to provide space for melting of the spacer material so that no resistance to polymerization shrinkage arises and to provide a small gas volume between the spacer and the monomer to serve as insulation to prevent heat loss when infrared spot heating is used to melt the spacers. When the spacers are enclosed in inert flexible wrappers, they advantageously may have been coated with a black paint or other infrared absorbing material to facilitate infrared spot heating. Such paint cannot be used on the unwrapped spacer for the paint film might contaminate the monomer, which possesses a powerful solvent action. The spacer material is recovered from the finished polymer sheet by either sawing or knocking the spacer material out of the flexible bags or by melting the spacer material from the polymer edge scraps.

While regenerated cellulose is a cheap, readily available inert and preferred material for construction of the flexible bag spacer wrappers, the following inert materials may also be employed: metal foils such as aluminum foil, copper foil, lead foil, tin foil and the like, parchment paper or a similar non-porous paper free of waxes, synthetic polymeric films such as biaxially stretched film of the polyester of ethylene glycol and terephthalic acid (Du Pont's Mylar), polyethylene film, polyvinyl alcohol film (this film should be nearly completely hydrolyzed and should contain a minimum of remaining acetate groups), polyvinylidene chloride film (Dow's Saran), nylon film and the like. This wrapper material should not be dissolved by the α-chloroacrylate monomer. It should be uniform in thickness and impervious to passage of the monomer in those cases when a spacer material is used which is soluble in the monomer. The wrapper should be sufficiently thin and pliable so that it offers little resistance to the movement of the casting plates during polymerization shrinkage. A transparent wrapper is preferred for convenience in ascertaining the fit of the wrapper about the spacer and in estimating the volume of gas space enclosed in the wrappers. The wrapper material should have little or no effect on the polymerization of adjacent monomer; and the wrapper should not be attacked by the melted spacer, in order to prevent any contact of polymer with melted spacer material where such contact would be detrimental to the properties of the polymer.

Methyl α-chloroacrylate has the peculiar property of being polymerized readily to a firm gel with very little attendant volume shrinkage, and in the gel condition it may be handled without fear of any substantial changes in size and shape taking place. The predominant portion of shrinkage takes place during the polymerization occurring after gelling. Accordingly, in putting the instant invention into effect, a casting cell whose walls are preferably composed of two polished glass plates is provided with a number of fusible spacers of the desired thickness and any convenient cross-sectional size and shape at suitable intervals around the periphery thereof to maintain said walls apart in parallel relationship. The cell wall edges, except for a space left for filling, are then sealed with any known edge-sealing composition, the cell filled with liquid monomer, the filling opening sealed, and the cell then subjected to gelling conditions, preferably in horizontal position, at a temperature below the melting point of the spacer material. The monomer in the casting cell may be gelled, for example, by means of ultra-violet irradiation, catalytic means, and/or gentle heating or any combination thereof.

The spacers may be safety removed by melting after the monomer sheet has been allowed to gel. The spacers may be melted by infrared spot heating or similar spot heating without heating the adjacent gelled sheet, or the spacer may be allowed to melt during the heating of the entire casting cell during or before those stages of the polymerization in which most of the polymerization shrinkage occurs. In the latter method of melting the spacer material, the melting point of the spacer material must be no higher than and preferably lower than the temperature at which polymerization (after the initial gelling) of the monomer being cast takes place. However, in the spot heating method, more leeway in the melting point of the spacer material is possible. In such cases, the melting point of the spacer material may even be above the temperature at which polymerization of the monomer occurs.

While the process of the invention has been described, and is particularly advantageous with respect to methyl α-chloroacrylate, other esters of α-chloroacrylic acid may be cast in accordance with this invention, as for example, alkyl esters such as ethyl, propyl, isopropyl, butyl, amyl, isoamyl, hexyl, octyl or lauryl esters; alkenyl esters such as allyl, methallyl or crotyl esters; polyhydric alcohol esters such as ethylene glycol or 1,4-butanediol esters; cycloalkyl esters such as cyclohexyl or methylcyclohexyl esters; aralkyl esters such as the benzyl esters; aryl esters such as phenyl or tolyl esters; and heterocyclic esters such as the tetrahydrofurfuryl ester.

The exact gelling and polymerizing conditions depend upon the activity of the monomer, i. e. its ease of polymerization. The ease of polymerization of the monomer is affected by its purity and by the absence or presence of inhibitors in the monomer. In addition, the activity of the catalyst and its concentration plays an important role in selecting the proper gelling and polymerizing conditions. The gelling and polymerizing conditions must be selected so that overheating due to too rapid polymerization is avoided. The only maximum limit on the length of time required to gel and polymerize the monomer is that imposed by economic operation of the casting process. The longer the time required to gel and polymerize the monomer, the more glass is tied up in casting cells and the more storage space is required for the cells.

The catalyst and its concentration, and/or the amount of irradiation and heat employed was usually so selected that gelling of the monomer was achieved in about 6 to 36 hours, although periods up to 48 hours have been employed to gel the monomer. The polymerization step in which the shrinkage occurs usually required 12 to 18 hours although periods up to 6 days have been employed.

By gelling is meant the attainment of a viscosity sufficiently great that liquid flow of the polymer-monomer solution does not occur (viscosity like "Jello").

The attached drawing is illustrative only of certain preferred embodiments of the instant invention. In the drawing:

Figure 1 is a view in perspective of a fusible spacer 1 enclosed in a flexible regenerated cellulose wrapping 2, which wrapped fusible spacer may then be employed in a casting cell in accordance with the instant invention.

Figure 2:
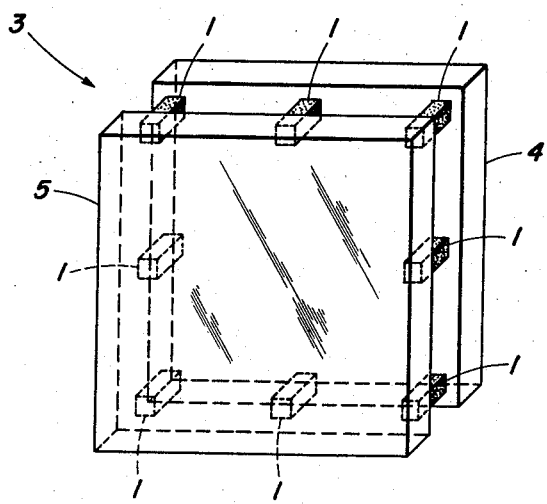

Figure 2 is a view in perspective showing the positioning of the fusible spacers 1 at spaced intervals around the periphery of glass plate cell walls 4 and 5, preparatory to the further steps of applying the edge seal and filling the cell with the alpha-chloroacrylic acid ester monomer.

Figure 3:
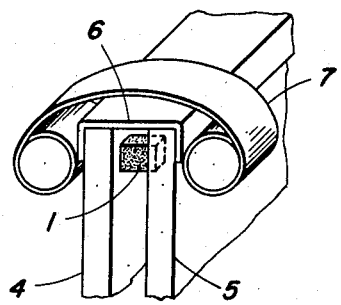

Figure 3 is a view in perspective, partly in section, taken from the direction of arrow 3 in Figure 2, showing the positioning of the edge seal 6, which may be a zein coated paper tape or the like, and spring clip 7 for maintaining contact between the inner surfaces of cell walls 4 and 5 with the polymer sheet during shrinkage attendant upon polymerization.

The following example in which parts are by weight unless otherwise indicated, is illustrative of the instant invention and is not to be regarded as limitative:

*Example*

Two 30" x 30" x ¼" sheets of plate glass were thoroughly cleaned with Igepal CA and warm water and rinsed with distilled water. The clean sheets were coated on the edges and within 1 inch of the edges with a warm gelatine solution which was allowed to gel at room temperature. The glass surfaces were then treated with a 1% solution of dimethyldichlorosilane (forms dimethylsiloxane polymer on glass which acts as mold release agent, see U. S. 2,461,480) in low boiling petroleum ether by pouring this solution over the glass casting surfaces. After evaporation of all of the petroleum ether, the glass surfaces were washed again with Igepal and warm water and rinsed with distilled water. The gelatine which had protected the edge area of the glass sheets from the silane treatment was washed off in this step. (The edge areas free of silane are necessary for adherence of the zein-paper edge seal.)

The clean glass sheets were separated a distance of 0.306" in a parallel face-to-face relationship by 8 amalgamated Wood's metal (parts by weight; 80 Wood's metal; 20 mercury; amalgam M. P. 53° C.) spacers (¼" x ¼" x 0.306") which were placed at the corners and at the midpoint of each edge.

The edges of the mold were then closed with paper tape coated with a zein solution. A small opening was left at one corner to allow the mold to be filled. After thorough drying of the paper-zein edge seal, the mold was ready for filling.

The mold was placed at a slight angle to the horizontal with the filling corner uppermost and it was filled with methyl α-chloroacrylate monomer possessing a freezing point of −37.14° C. to which had been added dibutyl tin diacetate to form a 0.06% solution in the monomer and di-tert.-butyl peroxide to form a 0.032% solution in the monomer. The filling corner was sealed off with a zein-paper covering after filling the casting cell. The filled casting cell was allowed to stand at room temperature (approx. 25° C.). After 17 hours at room temperature the monomer was almost gelled and would barely flow. After 21½ hours at room temperature the monomer was gelled and would no longer flow. The casting cell with the gelled monomer was placed horizontally into a 20° C. circulating oil bath 28½ hours after it had been poured. The oil bath was rapidly heated to a temperature of 58° C. A thermocouple, positioned next to the top outside surface at the middle of the casting cell and covered with a small lead weight, recorded the fact that the temperature at this point on the casting cell surface increased from 1° C. above the oil bath temperature to a peak of 5.0° C. above the oil bath temperature over a period of 5¾ hours. The temperature at the casting cell surface then gradually dropped until it reached the temperature of the oil bath 14 hours after the bath was raised to 58° C. The metal spacers had melted during this treatment and had permitted the glass sheets to approach each other while still in contact with the polymer.

Seventeen hours after the oil bath had reached 58° C., the casting cell was removed and placed in an oven where it was heated at 122° C.–126° C. for 22 hours. The transparent polymer sheet with smooth polished surfaces which was obtained after cooling and opening the casting cell measured from 0.244" in thickness to 0.253" in thickness, a variation of 0.009" in a sheet of ¼" nominal size.

Various modifications and variations of this invention will be obvious to persons skilled in the art and it is to be understood that such modifications and variations are to be included within the purview of this application and the spirit and scope of the appended claims.

I claim:

1. A method of producing a polymeric α-chloroacrylate sheet comprising subjecting an α-chloroacrylic acid ester, in a casting cell whose cell walls are sealed at their edges and separated by a plurality of fusible spacers distributed at suitable intervals around the periphery thereof, to gelling conditions at a temperature below the melting point of said spacers, applying heat to the spacers to melt them, and then completing the polymerization of the sheet while maintaining the edges of said cell walls sealed.

2. A method as defined in claim 1 wherein the spacers contain 80 parts by weight of Wood's metal and 20 parts by weight of Hg.

3. A method as defined in claim 1 wherein the spacers are melted by infrared spot heating.

4. A method as defined in claim 1 wherein the spacers are melted by uniformly heating the casting cell containing the gelled ester before any substantial polymerization shrinkage has occurred.

5. A method of producing a polymeric methyl α-chloroacrylate sheet comprising subjecting methyl α-chloroacrylate, in a casting cell whose cell walls are sealed at their edges and separated by a plurality of fusible spacers distributed at suitable intervals around the periphery thereof, to gelling conditions at a temperature below the melting point of said spacers, applying heat to the spacers to melt them, and then completing the polymerization of the sheet while maintaining the edges of said cell walls sealed.

6. A method as defined in claim 5 wherein the spacers contain 80 parts by weight of Wood's metal and 20 parts by weight of Hg.

7. A method as defined in claim 5 wherein the spacers are melted by infrared spot heating.

8. A method as defined in claim 5 wherein the spacers are melted by uniformly heating the casting cell containing the gelled methyl α-chloroacrylate before any substantial polymerization shrinkage has occurred.

9. A method as defined in claim 1 wherein the sheet is polymerized by means of a catalyst.

10. A method as defined in claim 1 wherein the sheet is polymerized by means of heat.

11. A method as defined in claim 1 wherein the sheet is polymerized by means of ultra-violet irradiation.

12. A method as defined in claim 1 wherein the fusible spacers are wrapped in inert flexible material.

13. A method as defined in claim 3 wherein the spacers are employed in contact with an infrared absorbing material and are wrapped in inert flexible material.

References Cited in the file of this patent
UNITED STATES PATENTS

| | | |
|---|---|---|
| 2,328,525 | Egolf | Aug. 31, 1943 |
| 2,409,958 | Rogers et al. | Oct. 22, 1946 |